(12) United States Patent
Downey et al.

(10) Patent No.: US 7,254,497 B2
(45) Date of Patent: Aug. 7, 2007

(54) ENERGY CONSUMPTION ANALYSIS FOR USE WITH A STORAGE SYSTEM

(75) Inventors: Neal Arthur Downey, Longmont, CO (US); Michael Gerard Goberis, Broomfield, CO (US); Matthew Thomas Starr, Lafyette, CO (US)

(73) Assignee: Spectra Logic Corporation, Boulder, CO (US)

( * ) Notice: Subject to any disclaimer, the term of this patent is extended or adjusted under 35 U.S.C. 154(b) by 155 days.

(21) Appl. No.: 11/145,768

(22) Filed: Jun. 6, 2005

(65) Prior Publication Data

US 2006/0277423 A1 Dec. 7, 2006

(51) Int. Cl.
G06F 19/00 (2006.01)
G01R 21/00 (2006.01)

(52) U.S. Cl. .......................................... 702/64; 702/60

(58) Field of Classification Search .................. 702/57, 702/60, 64, 65, 182, 188; 700/286, 291, 700/293; 713/300
See application file for complete search history.

(56) References Cited

U.S. PATENT DOCUMENTS

| | | | |
|---|---|---|---|
| 4,075,699 A * | 2/1978 | Schneider et al. .......... | 700/291 |
| 4,630,211 A | 12/1986 | Pettis | |
| 5,572,438 A | 11/1996 | Ehlers et al. | |
| 5,696,695 A * | 12/1997 | Ehlers et al. ............... | 700/286 |
| 6,148,623 A | 11/2000 | Park et al. | |
| 6,347,202 B1 | 2/2002 | Shishizuka et al. | |
| 6,490,123 B1 * | 12/2002 | Okunaga et al. ......... | 360/97.01 |
| 6,631,309 B2 | 10/2003 | Boies et al. | |
| 6,633,476 B1 | 10/2003 | Allina | |
| 2004/0105187 A1 | 6/2004 | Woodruff et al. | |
| 2004/0223253 A1 | 11/2004 | Woodruff et al. | |
| 2004/0264037 A1 | 12/2004 | Downey et al. | |
| 2004/0264038 A1 | 12/2004 | Heineman et al. | |
| 2004/0264039 A1 | 12/2004 | Armagost et al. | |
| 2004/0264040 A1 | 12/2004 | Armagost et al. | |
| 2004/0264041 A1 | 12/2004 | Kumpon et al. | |
| 2004/0264042 A1 | 12/2004 | Pollard et al. | |
| 2005/0007692 A1 | 1/2005 | Thompson et al. | |
| 2005/0047258 A1 | 3/2005 | Starr et al. | |

(Continued)

FOREIGN PATENT DOCUMENTS

| WO | WO 2005/010661 A2 | 2/2005 |
|---|---|---|
| WO | 05/45168 | 12/2005 |
| WO | 05/46447 | 12/2005 |

OTHER PUBLICATIONS

U.S. Appl. No. 10/950, 613, Starr et al.
U.S. Appl. No. 10/951,321, Wong.
U.S. Appl. No. 10/980,594, Fenske et al.
U.S. Appl. No. 11/011,812, Starr et al.
U.S. Appl. No. 11/019,911, Curtis et al.
U.S. Appl. No. 11/037,985, Permut et al.

(Continued)

*Primary Examiner*—Bryan Bui

(57) ABSTRACT

Methods and apparatuses are provided for analyzing energy consumption of at least one storage system capable of being used by multiple users. The storage system includes a plurality of electric energy consuming components which further includes at least a plurality of storage devices adapted to cooperate with storage media for storing data. At least one component energy meter is capable of measuring component energy consumption of at least one of the electric energy consuming components while the storage system is in operational use. At least one storage system energy meter is adapted to cooperate with the storage system to measure total energy consumption of the storage system while the storage system is in operational use.

22 Claims, 12 Drawing Sheets

U.S. PATENT DOCUMENTS

| | | |
|---|---|---|
| 2005/0057847 A1 | 3/2005 | Armagost et al. |
| 2005/0063089 A1 | 3/2005 | Starr et al. |
| 2005/0065637 A1 | 3/2005 | Lantry et al. |
| 2005/0185323 A1 | 8/2005 | Brace et al. |
| 2005/0195517 A1 | 9/2005 | Brace et al. |
| 2005/0195518 A1 | 9/2005 | Starr et al. |
| 2005/0195519 A1 | 9/2005 | Kumpon et al. |
| 2005/0195520 A1 | 9/2005 | Starr et al. |
| 2005/0219964 A1 | 10/2005 | Pollard et al. |
| 2005/0246484 A1 | 11/2005 | Lantry et al. |
| 2005/0267627 A1 | 12/2005 | Lantry et al. |

OTHER PUBLICATIONS

U.S. Appl. No. 11/040,937, Starr et al.
U.S. Appl. No. 11/089,749.
U.S. Appl. No. 11/123,725, Rector et al.
U.S. Appl. No. 11/126,025, Rector et al.
U.S. Appl. No. 11/230,146, Starr et al.
U.S. Appl. No. 11/240,893, Starr et al.
U.S. Appl. No. 11/264,920, Lantry et al.

* cited by examiner

ENERGY CONSUMPTION ANALYSIS FOR USE WITH A STORAGE SYSTEM

CROSS-REFERENCE TO RELATED APPLICATIONS

None

FIELD OF THE INVENTION

The present invention relates generally to methods and apparatus for analyzing energy consumption of at least one storage system capable of being used by multiple users.

BACKGROUND

Data storage systems, such as tape libraries or disc drive libraries for example, are typically used to store and retrieve large amounts of data for data manipulation and archiving purposes. These storage systems are generally comprised of energy consuming components, such as drive devices (adapted to read and write data to and from media that are typically contained within the libraries), fans, robotic systems, central processing units, etc. The amount of energy consumed by a storage system generally increases with increased storage activity, such as reading or writing data. Such energy consumption, however, is generally accounted for by a predicted average for each data storage system.

Data storage systems are often located in storage centers capable of supporting data needs for multiple users, such as a storage hub used for networking applications. Such storage centers are often facilities that house one or more data storage systems located for example, in designated rooms. The energy consumption predicted for each storage system generally comprises heating and cooling predictions, facility lighting and general storage-related activity predictions. Often, a user is monetarily charged fixed costs for at least a proportional share of the storage system facility that houses that user's storage system, and predicted energy consumption based on the user's percentage of total storage space available. Charging a proportional share of a storage center to each user can be inequitable between a user that actively stores and retrieves data compared with a user that is relatively inactive, especially during times of high energy costs. Furthermore, monitoring the energy consumption of a storage system component may be useful in detecting malfunctions in the component, and in assessing the need for preventive or necessary maintenance on the component.

In an effort to provide an improvement in actual user percentage costs of a storage system, both methods and apparatus are proposed herein. It is to innovations related to this subject matter that the claimed invention is generally directed.

SUMMARY OF THE INVENTION

The present invention relates generally to methods and apparatus for analyzing energy consumption of at least one storage system capable of performing storage operations by multiple users.

One embodiment of the present invention can therefore comprise a storage system comprising: a plurality of electric energy consuming components; the electric energy consuming components comprising at least a plurality of storage devices adapted to cooperate with storage media for storing data; the storage system comprising a total user storage capacity for the storage system; at least one component energy meter capable of measuring component energy consumption of at least one of the electric energy consuming components while the storage system is in operational use; at least one storage system energy meter adapted to cooperate with the storage system to measure total energy consumption of the storage system while the storage system is in operational use.

Another embodiment of the present invention can therefore comprise a method for monitoring energy consumption of a storage system comprising: measuring at least total storage system energy consumption of the storage system while the storage system is in operational use wherein the storage system comprises a plurality of energy consuming components; providing an energy usage analysis of the total energy consumption over a period of time.

Yet another embodiment of the present invention can therefore comprise an energy monitoring storage system comprising: a plurality of electric energy consuming components; the electric energy consuming components comprising at least a plurality of storage devices adapted to cooperate with storage media for storing data; the storage media comprising a total user storage capacity for the storage system; at least one storage system energy meter adapted to cooperate with the storage system to measure total energy consumption of the storage system while the storage system is in operational use; the total user storage capacity capable of being divided into at least two partitions wherein each of the partitions is capable of being monitored for partition energy consumption.

Yet another embodiment of the present invention can therefore comprise a means for monitoring energy consumption of a storage system comprising: a means for measuring component energy consumption of at least one electric energy consuming component comprised by the storage system while the storage system is in operational use; a means for measuring total storage system energy consumption of the storage system while the storage system is in operational use; a means for partitioning the storage system into at least two fractions comprising a total user storage capacity of the storage system; a means for monitoring partition energy consumption by the partition; a means for providing an energy usage analysis of the at least one of the partition over a period of time.

Yet another embodiment of the present invention can therefore comprise a method for allocating energy consumption costs to each respective user of a partitioned data storage system comprising the steps of: calculating an overhead energy cost associated with each respective user's data partition; monitoring the actual energy consumption associated with each respective user's data partition, and calculating an actual energy consumption cost based thereon; and summing the overhead energy cost with the actual energy consumption cost to calculate an allocated energy cost for the each respective user.

DETAILED DESCRIPTION

Figure 1:
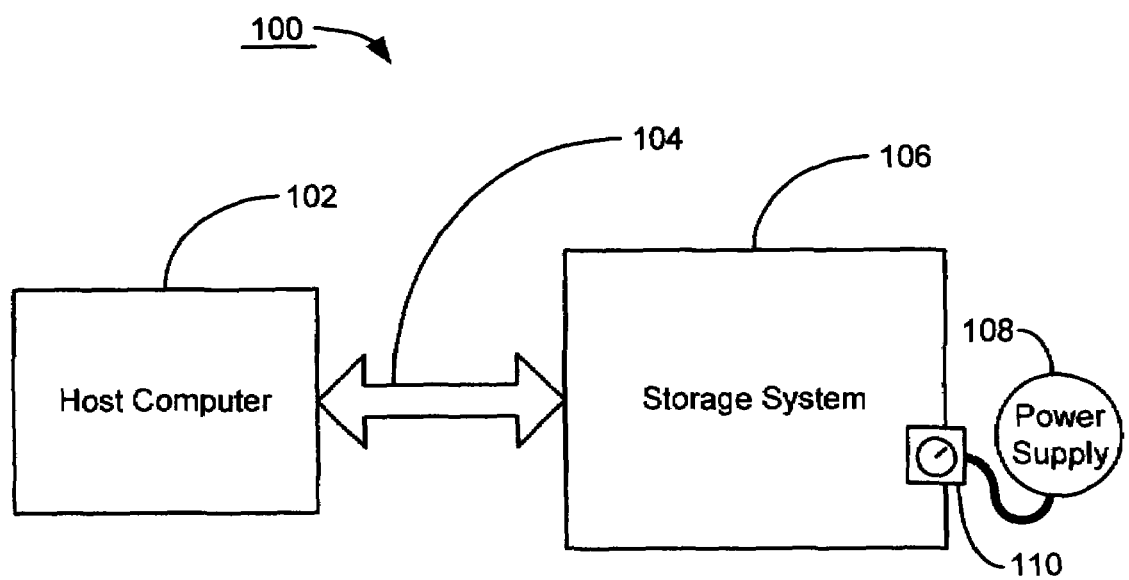
FIG. 1 is a block diagram of a data storage arrangement constructed in accordance with an embodiment of the present invention.

Referring to the drawings in general, and more specifically to FIG. 1, shown therein is a block diagram of a data storage arrangement 100 constructed in accordance with an embodiment of the present invention. In what follows, similar or identical structure is identified using identical callouts.

The data storage arrangement 100 is a block diagram of a host computer 102 in communication 104 with a storage system 106. The storage system 106 is adapted to draw power, typically AC power, from a power supply 108. In this embodiment, the storage system 106 comprises a storage system energy meter 110 adapted to cooperate with the storage system 106 to measure total energy consumption of the storage system 106 while the storage system 106 is in operational use. Operational use is considered to be in a state of operation, typically by an end user, such as in a commercial application for example, and not in a test environment, such as with an original manufacturer or test technician for example. The host computer 102 could be a personal computer, a server, a main frame computer, a workstation or any other such computer system linked to the storage system 106, just to name a few examples. The communication path 104, at a minimum, needs only to facilitate communication between the host computer 102 and the storage system 106. The means for communication can be accomplished by a dedicated pathway (such as a SCSI [Small Computer Systems Interface] cabled connection) or, in an alternative embodiment, a pathway over a network (such as a LAN, WAN, or other communication architecture), for example. Furthermore, the communication path can be in the form of a wire line pathway, wireless, or a combination thereof, for example. Finally, the storage system 106 is capable of storing and retrieving data for the host 102. Examples of a storage system include a disc drive or multiple disc drives, a storage library, such as a virtual tape library, a disc drive magazine library, or a tape cassette library, just to name a few.

Figure 2:
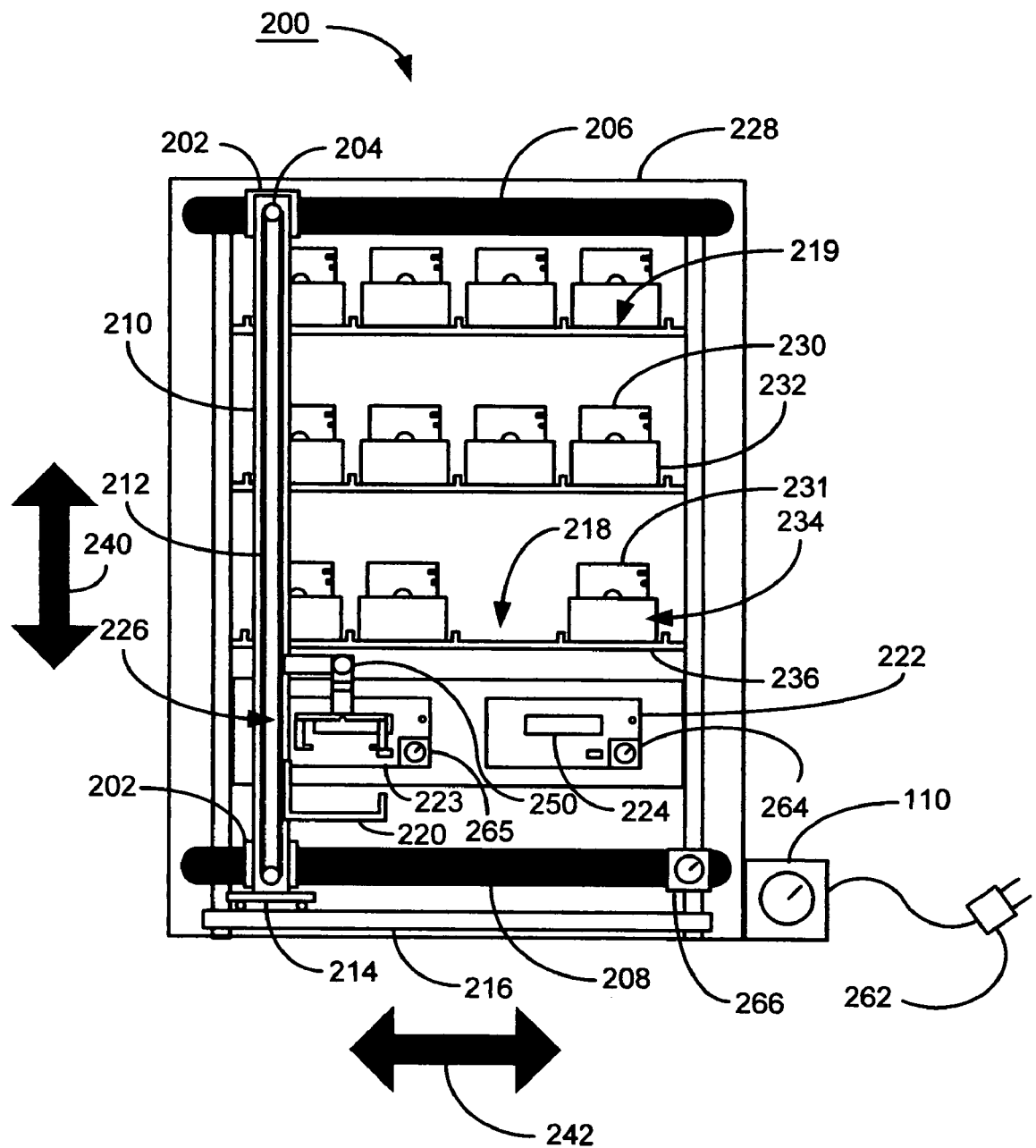
FIG. 2 is a tape storage library consistent with some embodiments of the present invention.

While the claimed invention has utility in any number of different applications, the tape storage library 200 of FIG. 2 has been provided to illustrate a suitable environment in which the claimed invention can be practiced. In this embodiment, the tape storage library 200 generally comprises a plurality of storage media elements 234, support locations 218 for the media elements 234, in addition to energy consuming components such as a robotic system 266 and storage devices 222, all of which is substantially contained within an enclosure 228. The tape library 200 also comprises a storage system energy meter 110 that is intermediate a plug 262 and the storage library 200. The storage system energy meter 110 is capable of measuring the energy used for the entire storage library 200. Here, the storage elements 234 are illustratively shown as tape packs, which comprise a magazine 232 adapted to support a plurality of tape cassettes 230. The media elements 234 are disposed at the support locations 218. In this illustrative embodiment, four media elements 234 are shown disposed on to a shelf system 236 creating the support locations 218.

In the embodiment shown in FIG. 2, a tape pack 234 (which is only one illustrative form of media element) can be transported from desired locations such as from one of the support locations 218 to one of the storage devices 222, or vice versa. Here, the means for transporting the tape pack 234 within the tape library 200 is accomplished by positioning a grasping device 250 and a transporting device 220, illustrated here in a simplified representation, to and from the desired locations. In this example, the grasping device 250 and transporting device 220 are connected to a belt 212 and a motorized pulley system 204 capable of moving the grasping and transporting devices 250 and 220 along the vertical support beam 210, as illustrated by the vertical two way arrow 240. The robotic system 226 further can employ a positioning motor system 202 to move along upper 206 and lower 208 robot guides, which are adapted to provide a path for the robotic system 226 to traverse across the tape library 200 as illustrated by the horizontal two way arrow 242. In this example, a chassis 214 supports the robotic system 226 for moving horizontally 242 across a robotic support beam 216. The robotic system 226, as shown in this embodiment, comprises a robotic energy meter 226 that is capable of monitoring the energy used by the robotic system 226, such as when transferring media elements 234 (and more specifically tape cassettes 230 as shown in this embodiment) to and from the storage devices 222. By monitoring the energy consumed, the quantity of the consumed energy can be accounted for, and used or reported to a storage center for example. As one of ordinary skill in the art will appreciate, the functions of the positioning motor system 202 and the upper 206 and lower 208 robot guides in addition to the belt 212 and pulley system 204 can be accomplished with a variety of different positioning systems, such as a lead screw system or a belt and pulley system for all, just to name a couple of examples.

In the illustrative embodiment of FIG. 2, the robotic system 226 can position the grasping 250 and transporting 220 devices for transferring a media element 234 between the support location 218 and a storage device 222. The support location 218 in this embodiment is illustratively shown as a shelving system, though other support means, such as, recessed openings and cantilevered supports, could be used instead. In this embodiment, a tape cassette 230 is removed from the magazine 232 by the grasping and transporting devices 250 and 220, and inserted into an opening 224 in the storage device 222 for reading and writing data to and from the tape cassette 230. Once a desired data operation is complete, the tape cassette 230 is returned to the magazine 232 by the grasping and transporting devices 250 and 220. Hence, the activity of moving a media element 232 from a storage location 218 to a drive 224 and vice-versa could be in response to a data storage request by a user of the library system 200. The energy required for using the robotic system 226 during storage operations can be monitored by a robotic system energy meter 266. Also, a storage device energy meter 264 can further monitor the energy consumed in the storage operation on behalf of the user, for example.

Figure 3:
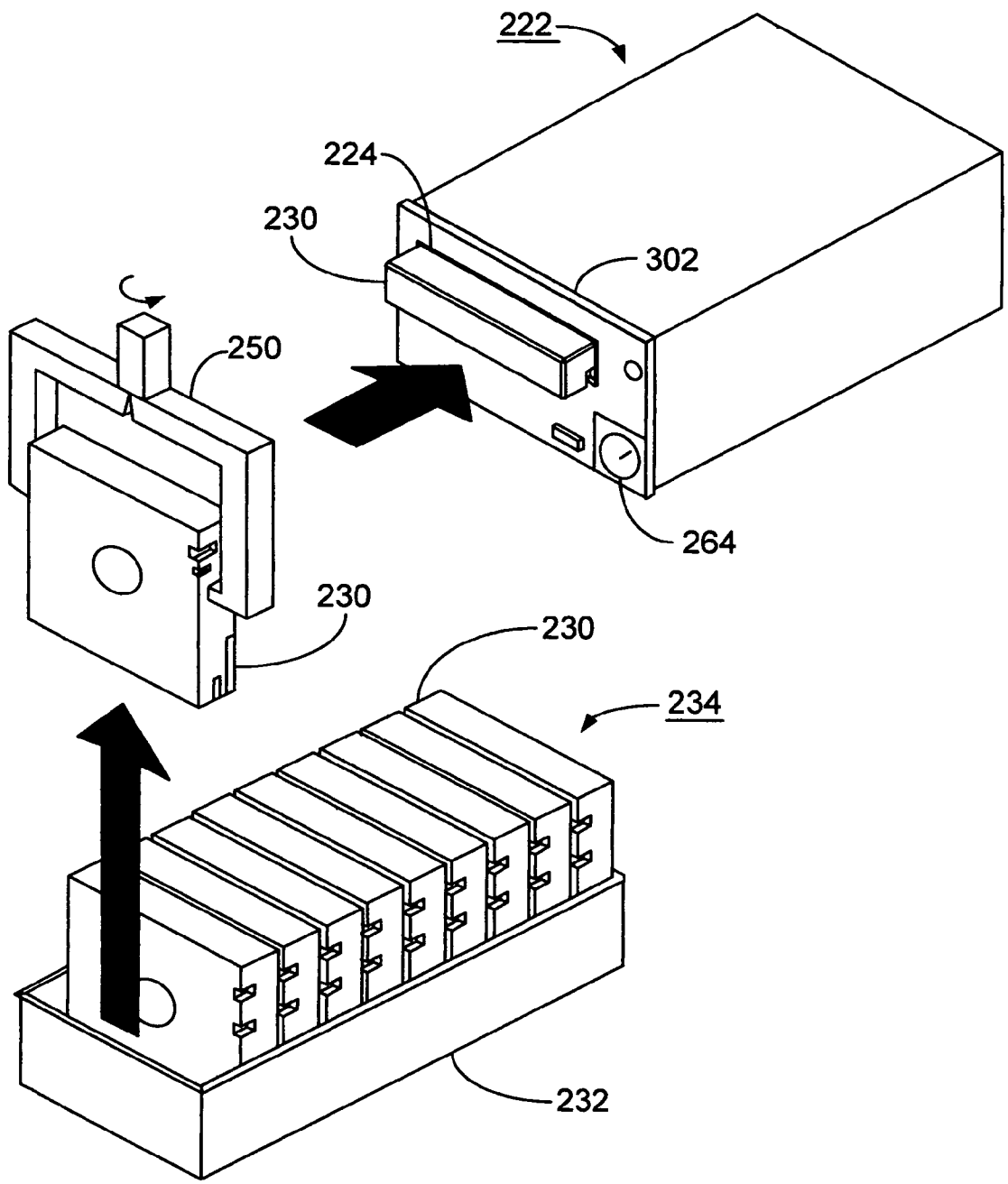
FIG. 3 illustrates the transfer of a tape cassette between a storage device and a magazine consistent with some embodiments of the present invention.

FIG. 3 illustrates the transfer of a tape cassette 230 between a storage device 222 and a magazine 232. Herein shows the grasping device 250 transferring a tape cassette 230 from a magazine 232 for use with a tape drive storage device 222. The tape cassette 230 can be inserted in the opening 224 in the face 302 of the storage device 222 allowing data to be transferred to and from the tape cassette 230.

Figure 4A:
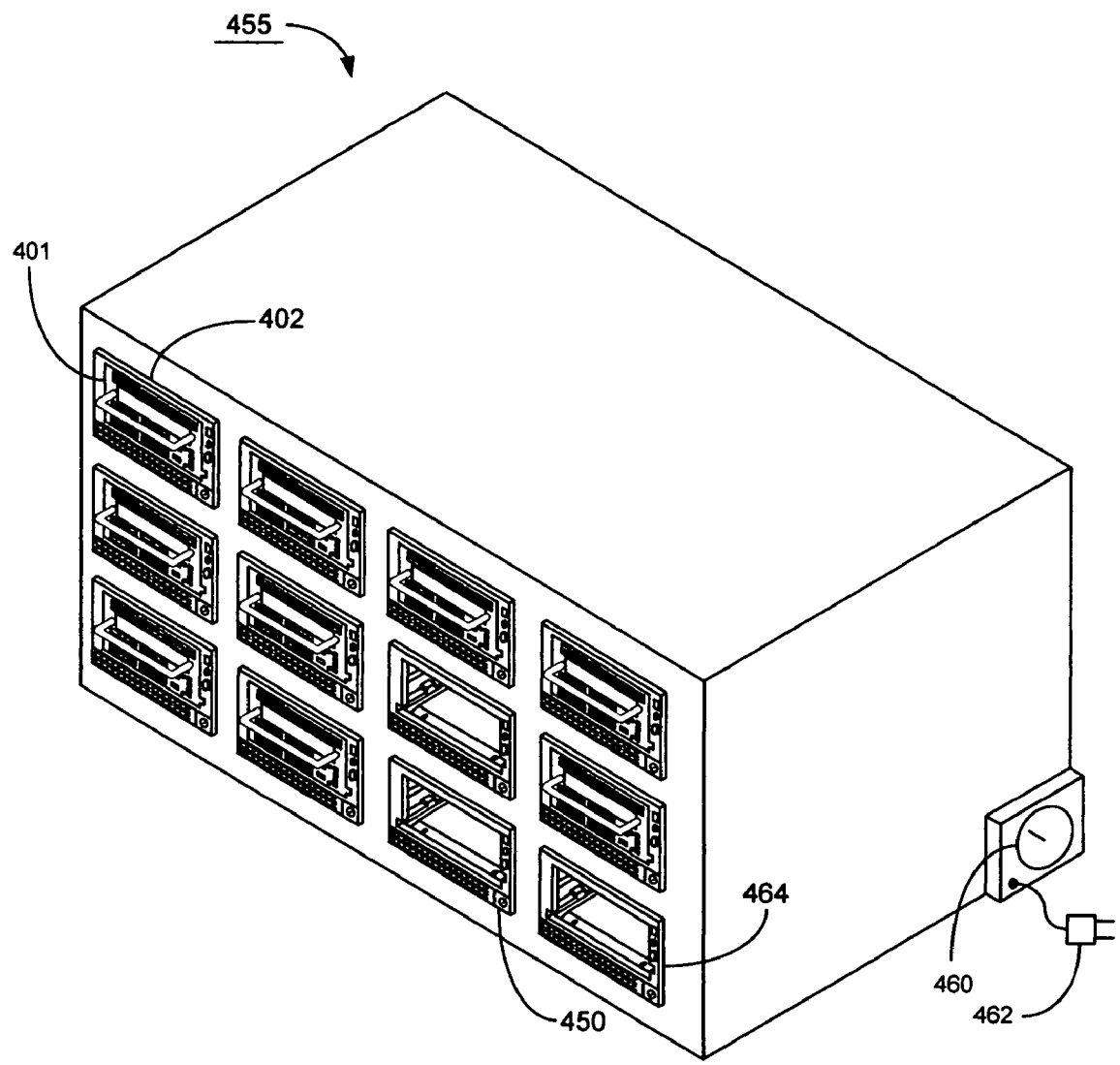
FIG. 4A is an example of a storage system wherein the present invention can be practiced consistent with some embodiments of the present invention.

FIG. 4A is an example of a commercial storage system 106 with which the present invention can be practiced. Here, an RXT disc drive magazine library 455 from Spectra Logic Corp. of Boulder, Colo. comprises a plurality of disc drive magazines 401 and docking stations 402 operatively linked to one another to function as the RXT library 455. The disc drive magazines 401 are adapted for mobility such as for removal from or insertion into a docking station 402, as illustrated by a vacant docking station 464 capable of receiving a disc drive magazine 401, for example. Herein, each of the docking stations 402 are equipped with a dedicated disc drive magazine energy meter 450 adapted to monitor the energy consumption of the associated disc drive magazine 101. In an alternative embodiment, less than all of the docking stations 402 may be equipped with a dedicated disc drive magazine energy meter 450. The RXT library 455 also comprises a storage system energy meter 460 intermediate a plug 462 and the storage system 455. The storage system energy meter 460 is capable of measuring the energy used for the entire storage system 455.

Figure 4B:
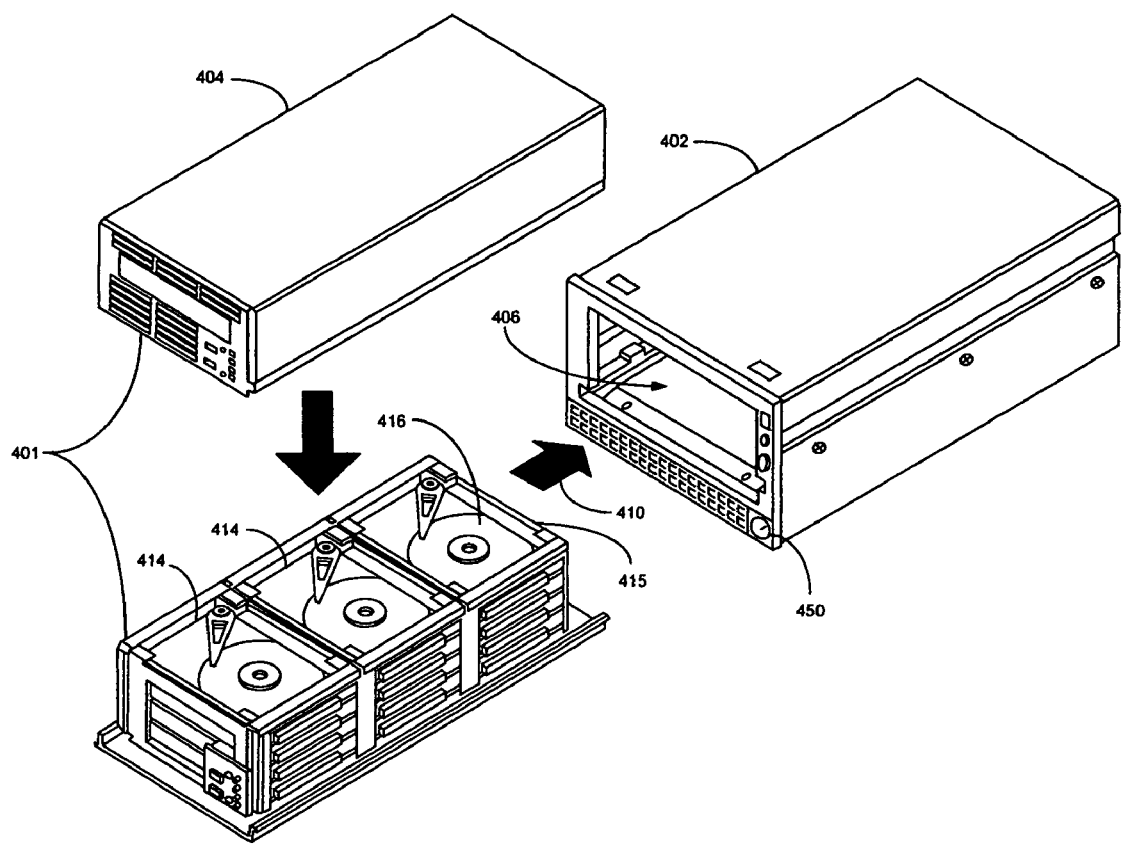
FIG. 4B illustrates an embodiment of an RXT disc drive magazine and docking station consistent with some embodiments of the present invention.

FIG. 4B shows a more detailed illustration of an embodiment of an RXT disc drive magazine 401 and docking station 402. Here, a plurality of disc drives 414 are substantially contained by an enclosure 404 generally comprising the mobile disc drive magazine 401. A conventional magnetic disc drive 414 comprises a magnetic disc medium 416 wherein digital data are recorded. A disc drive 414 is only one embodiment of a random access memory device, which, in further embodiments, can include flash memory and optical memory, just to name a few. The mobile disc drive magazine 401 is adapted to be received by an opening 406 in the docking station 402 as shown by the arrow 410. In an alternative arrangement, the docking station 402 can be used as a stand-alone storage system, such as the storage system 106. The engaging surface 415 of the mobile disc drive magazine 401 is adapted with electrical contacts (not shown) to contact with complementary electrical contacts (not shown) on the engaging surface (not shown) of the docking station 402. When contact is made, the transmission of data can occur between the docking station 402 and the mobile disc drive magazine 401. Furthermore, power can be provided to the mobile disc drive magazine 401 by the docking station 402. Power and data transmission provide a cooperatively linked state between the mobile disc drive magazine 401 and the docking station 402. The docking station 402 is capable of being electrically connected with a host device, such as the host computer 102 for example, or other storage device/s, such as the RXT storage library 455 for example, by a coupling means, such as wires, plugs-in, wireless transmission (e.g., IR, RF) or any combination or equivalence thereof, just to name a few examples. By linking the docking station 402 with the storage system 455, a connected disc drive magazine 401 is effectively in a cooperatively linked state with the storage system 455. The docking station 402 is equipped with a dedicated disc drive magazine energy meter 450 that is adapted to cooperate with the disc drive magazine 401 to monitor the energy consumed by the magazine 401 and/or docking station 402. As one skilled in the art will appreciate, the magazine 401 can comprise a dedicated energy meter, or alternatively a dedicated energy meter for the docking station 402 and/or the disc drive magazine 401 can be disposed in the RXT library 455 capable of electrically coupling with the component of interest, such as the docking station 402, while still maintaining substantially the same functionality and without departing from the scope and spirit of the present invention.

Figure 5:
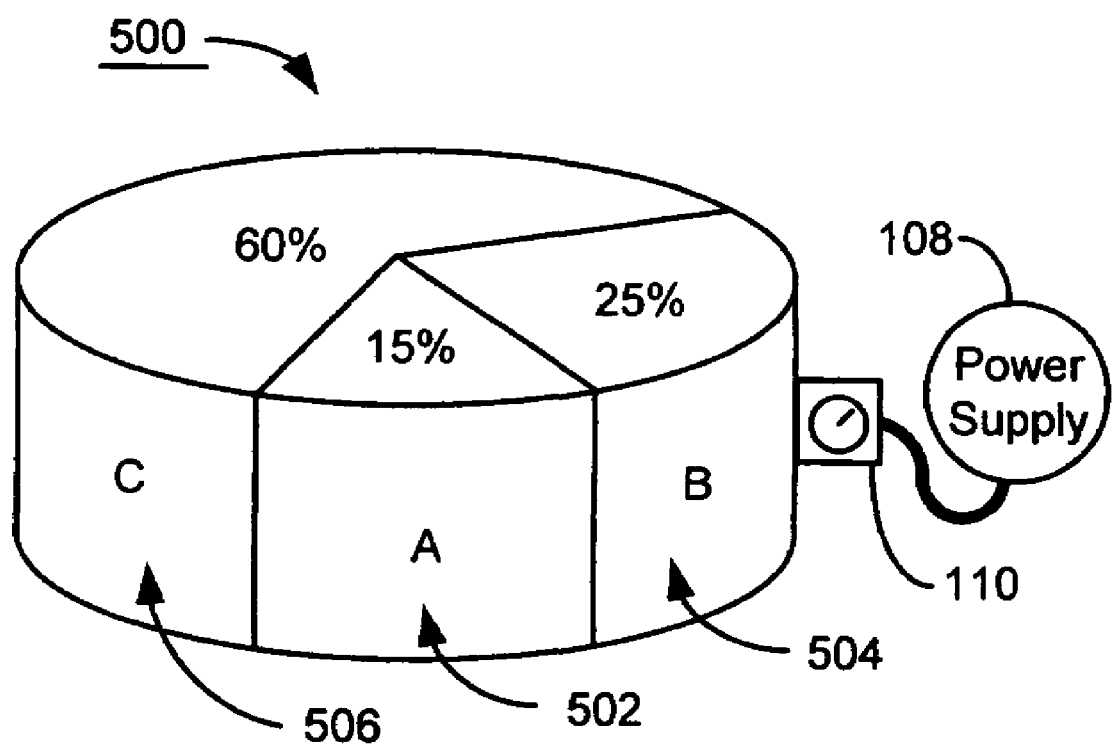
FIG. 5 is an extruded pie chart of a partitioned storage system consistent with embodiments of the present invention.

FIG. 5 is an extruded pie chart of a partitioned storage system 500 consistent with some embodiments of the present invention. Herein, the storage system 500 has a total user storage capacity that is divided into three partitions; A 502, B 504 and C 506. In this embodiment, the total user storage capacity is the storage space that a user can access to store their data. Memory that is not considered included in the total user storage capacity may be buffer memory or dedicated system memory, which is often used as temporary memory or system memory adapted to store firmware for storage system operation, for example. In the illustrative chart of FIG. 5, partition A 502 comprises 15% of the total user memory of the storage system 500, partition B 504 comprises 25% of the total user memory of the storage system 500 and partition C 506 comprises 60% of the total user storage capacity of storage system 500. A first partition, such as partition A 502, can be storage space owned or rented by a first user and a second partition, such as partition C 506, can be storage space owned or rented by a second user, for example. As one skilled in the art will appreciate the same user may own multiple partitions depending on a user's storage needs, for example.

In one embodiment of the present invention, the energy consumption of each of the partitions A 502, B 504 and C 506 can be monitored from overhead energy consumed proportionally by each of the partitions, A 502, B 504 and C 506, plus an increase in the total energy use of the system 500 over a period of time in which one of the partitions, such as partition C 506, is active as measured by the storage system energy meter 110. The overhead energy is the energy of the storage system in an 'on' state when the storage system 500 is not actively performing any storage related activities specific to any of the partitions 502, 504 and 506. The overhead energy may be the energy required to run basic cooling fans, lights, monitors and low level readiness of the storage system 500 just to name a few examples. To illustrate one example of this embodiment, partition C 506, comprising 60% of the total user storage capacity of the storage system 500, therefore consumes 60% of the total overhead energy of the storage system 500 (which is the proportional amount of total overhead energy relative the divided total user storage capacity for partition C 506). The total overhead energy of the storage system 500 can be measured by the system energy meter 110 (which can be intermediate the power supply 108 as shown here). When partition C 506 is active, such as when recording data for a user, the storage system energy meter 110 will register an increase in energy consumption above the overhead energy of the storage system 500. An algorithm executed by a processor and associated memory, for example, can record the increased energy consumption during the time period that partition C 506 is active, which when added to the percentage of total overhead energy consumed by partition C 506 will total the energy consumed by partition C 506.

In an alternative embodiment of the present invention, partition energy consumption can be monitored from at least one component energy meter, such as the storage device energy meter 264 of FIG. 2, cooperating with at least one energy consuming component, such as the tape drive 222, associated with the partition, such as partition B 504. For purposes of illustration, the following example is a combination of the partition arrangement of the total storage capacity of storage system 500 and the storage library 200 of FIG. 2. In this example, partition B 504 comprises 25% of the storage capacity of the storage library 200. Hence, 25% of the tape cassettes 230 are allocated to partition B 504. When a first user requests data storage for partition B 504, for example, one or more tape cassettes 230 allocated to partition B 504 are transported from a first storage location 218 within the storage library 200 to a first tape drive 222, for example, via the robotic system 226. The robotic system 226 comprises a robotic system energy meter 266 which is capable of monitoring the energy consumption of transporting the first tape cassettes 230 within the storage library 200 allocated to partition B 504. The first tape drive 222 is capable of monitoring the energy consumption during storage operations on behalf of partition B 504 with the first tape drive energy meter 264. Hence, the energy consumption of partition B 504 can be monitored by energy consuming components temporarily being used by (or associated with) partition B 504. Furthermore, when a second user requests data storage for partition A 502, one or more tape cassettes 231 allocated to partition A 502 are transported from a second storage location 219 within the storage library 200 to a second tape drive 223 via the robotic system 226. The second tape drive 223 can monitor the energy consumption with a dedicated tape drive energy meter 265 during storage operations on behalf of partition A 502. Hence, the energy consumption of partitions A 502 and B 504 can be monitored by the first 264 and second 263 dedicated tape drive energy meters and the robotic energy meter 266 can be monitored by the robotic system energy meter 266, all of which can be temporarily used by (or associated with) partition A 502 and B 504 substantially at the same time, in a coincidental manner. Such energy monitoring can be accomplished by an algorithm or switching system for accounting energy usage associated with partitions A 502 and B 504, for example. Additionally, the total energy consumption by partitions A 502 and B 504 can be determined by adding the overhead energy for partition A 502 and B 504. Accounting for energy consumption by partitions A 502, B 504 and C 506 can provide actual energy costs for a user paying for one of the partitions, such as partition A 502 for example. As one skilled in the art will appreciate, display monitors, fans, and other energy consuming components having dedicated energy meters can be combined with the above example while still maintaining substantially the same functionality and without departing from the scope and spirit of the present invention.

Figure 6:
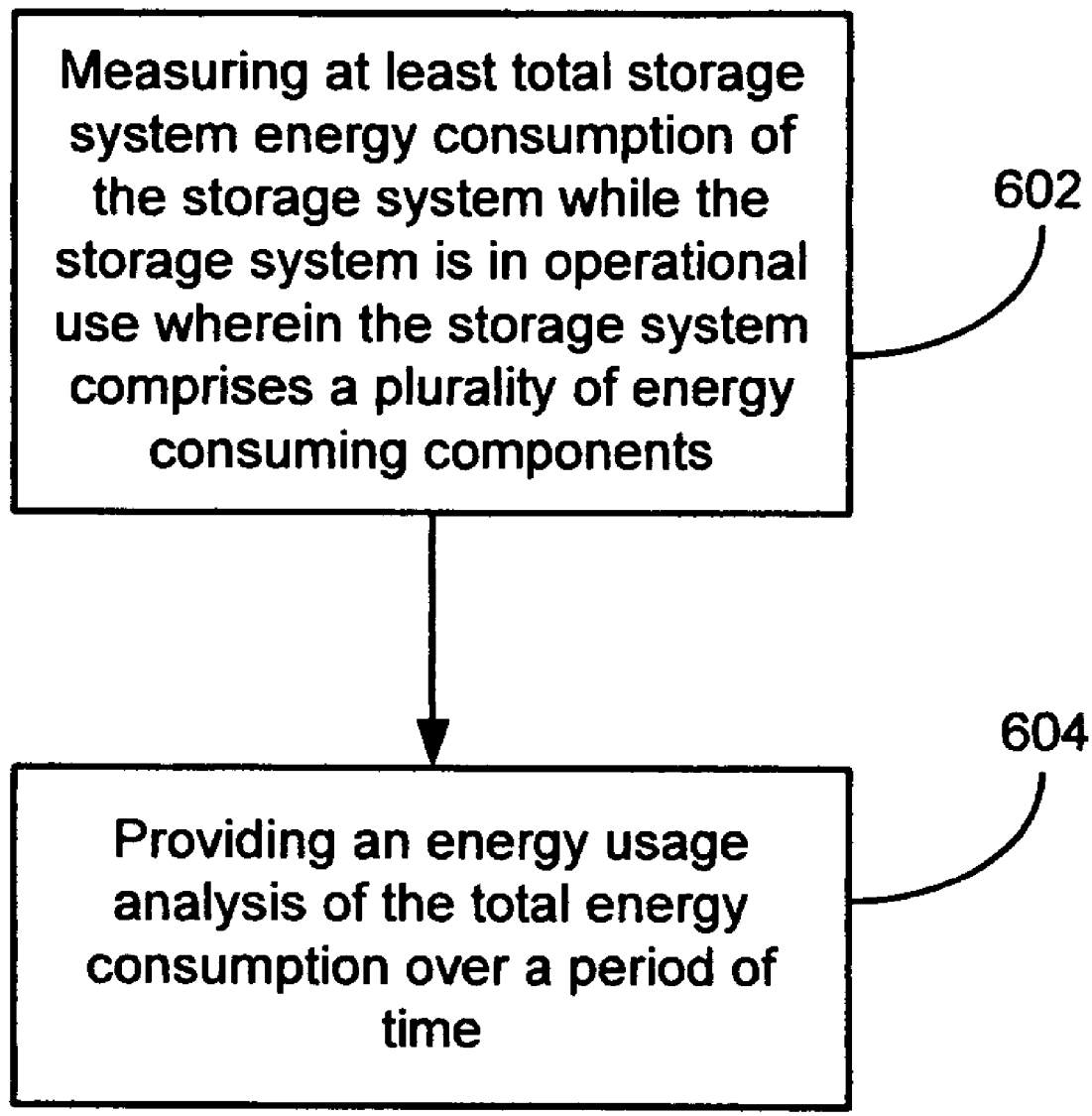
FIG. 6 is a method for monitoring energy consumption of a storage system consistent with an embodiment of the present invention.

Referring now to FIG. 6, shown therein is a method for monitoring energy consumption of a storage system consistent with an embodiment of the present invention. In step 602, at least total storage system energy consumption of the storage system, such as the storage system 106 of FIG. 1, is measured while the storage system 106 is in operational use wherein the storage system 106 comprises a plurality of energy consuming components, such as the disc drive magazine 401 of FIG. 4 for example. A means for measuring total storage system energy consumption of the storage system 106 while the storage system 106 is in operational use can be accomplished with a storage system energy meter, such as the energy meter 110 for example, that may use a current transformer and digital signal processor in-line with incoming power capable of transmitting the data for storage to measure power over time. In step 604, an energy usage analysis of the total energy consumption over a period of time is provided. A means for providing the total energy consumption over a period of time can be accomplished with an energy meter capable of monitoring energy consumed over a time period of interest such as one with digital record that can easily be manipulated to provide at least this information.

Figure 7:
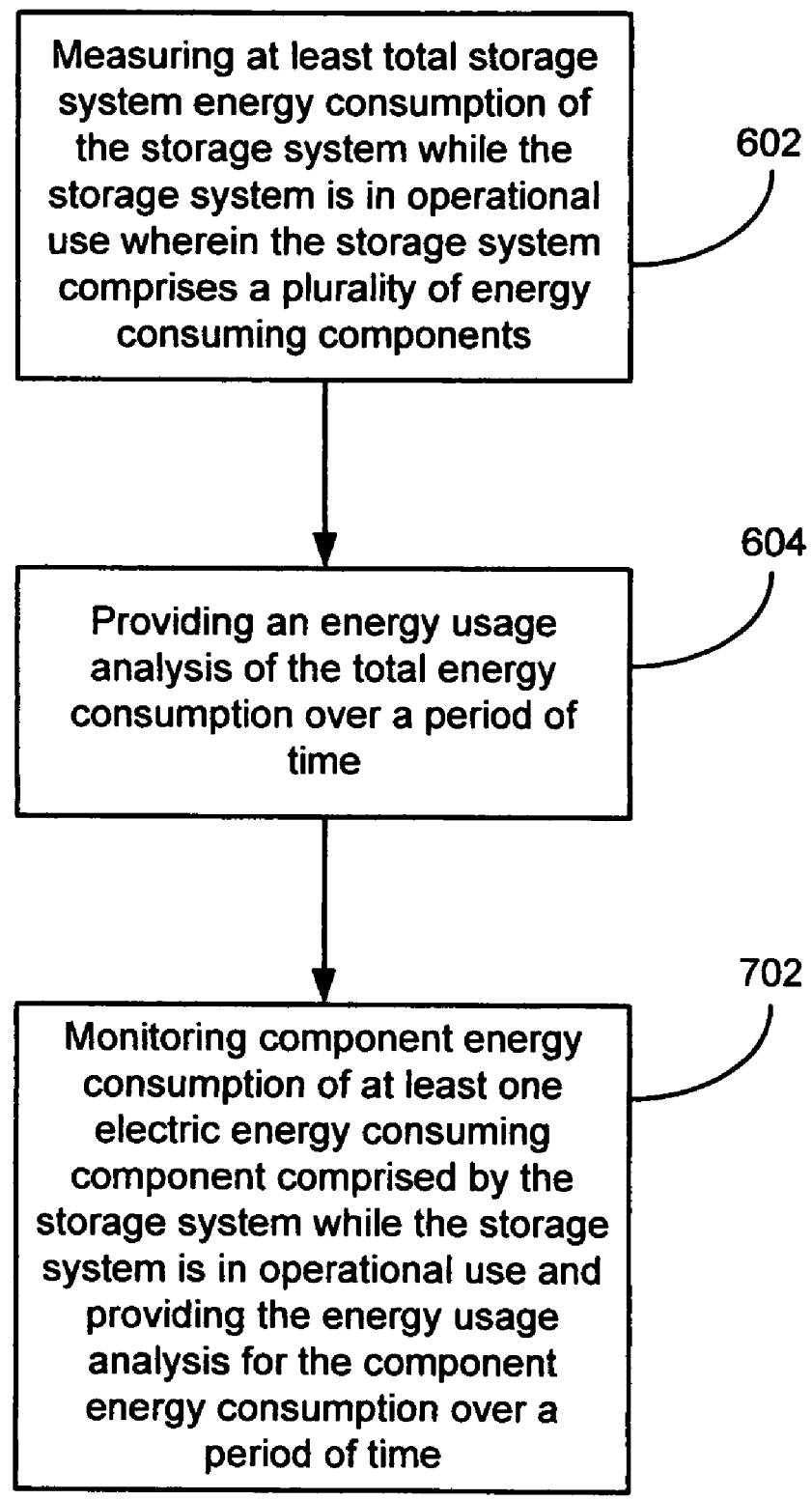
FIG. 7 is an alternative embodiment of the present invention which includes method steps from FIG. 6 consistent with some embodiments of the present invention.

FIG. 7 is an alternative embodiment of the present invention which includes method steps 602 and 604 from FIG. 6. It should be recognized that the steps presented in the described embodiments of the present invention do not require any particular sequence. Here, step 702 shows component energy consumption of at least one electric energy consuming component, such as the disc drive magazine 401, comprised by the storage system, such as storage system 106, while the storage system 106 is in operational use being monitored in addition to providing the energy usage analysis for the component energy consumption over a period of time. A means for measuring component energy consumption of at least one electrical energy consuming component 401 comprised by the storage system 106 while the storage system 106 is in operational use can be accomplished with a component energy meter, such as the disc drive magazine docking station energy meter 450 for example.

Figure 8:
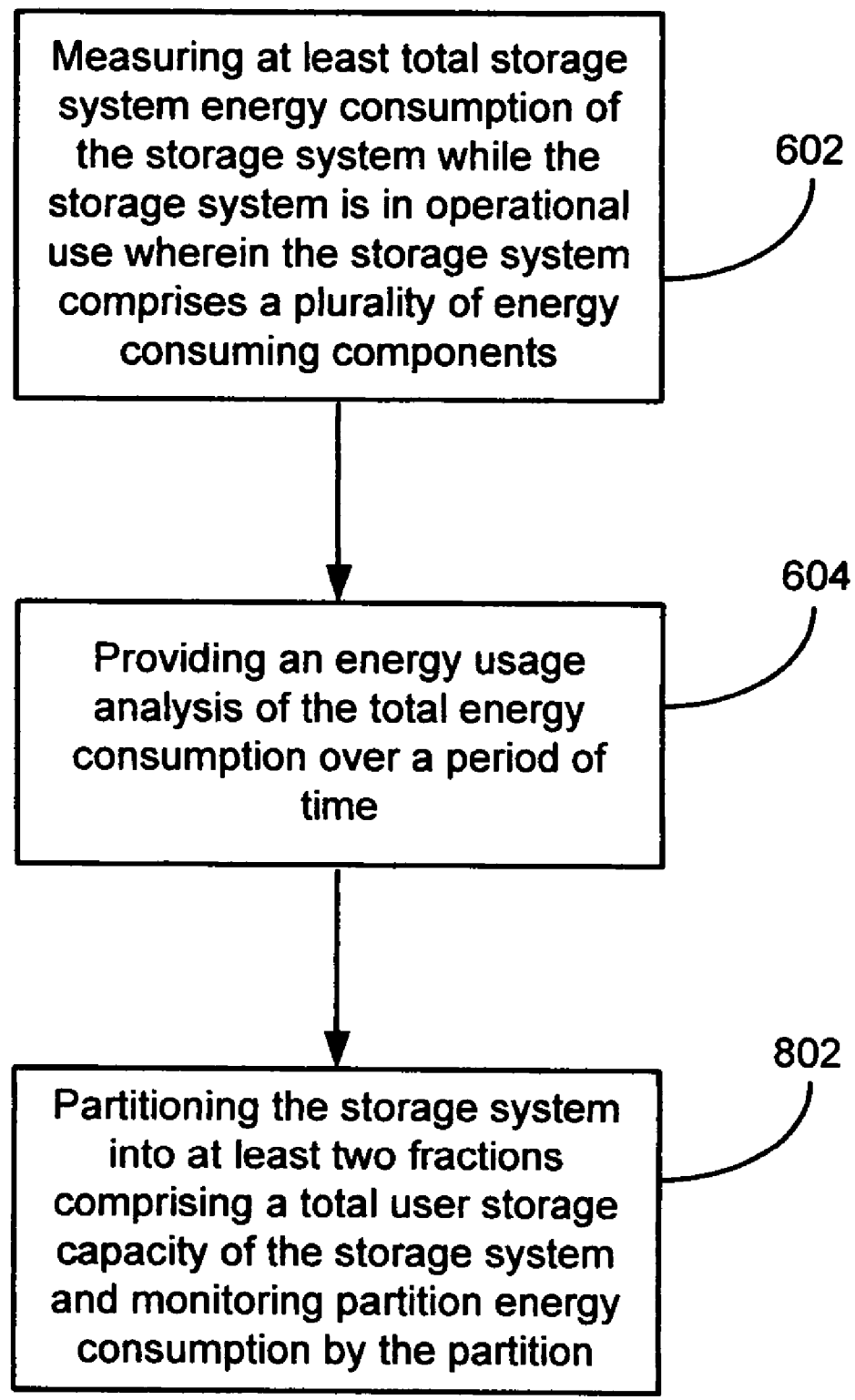
FIG. 8 is yet another alternative embodiment of the present invention which includes method steps from FIG. 6 consistent with some embodiments of the present invention.

FIG. 8 is yet another alternative embodiment of the present invention which includes method steps 602 and 604 from FIG. 6. It should be recognized that the steps presented in the described embodiments of the present invention do not require any particular sequence. Here, step 802 illustrates partitioning the storage system, such as storage system 500 from FIG. 5, into at least two fractions, such as partitions A 502, B 504 and C 506, comprising a total user storage capacity of the storage system 500 and monitoring partition energy consumption by the partition, such as partition C 506 for example. A means for partitioning the storage system 500 into at least two fractions comprising a total user storage capacity of the storage system 500 can be accomplished with software internal to the storage system 500 that is capable of partitioning the storage system 500 in response to a command from a host or user for example. A means to monitor the partition energy consumption used by a partition, such as partition A 502 for example, can be accomplished by an algorithm tracking increased energy use by partition A 502 as monitored by the storage system energy meter, such as the energy meter 110, when partition A 502 is actively engaged in storage related activity at the request of a user for example. Optionally, energy use specific to partition A 502 can be monitored by component energy meters, such as a docking station energy meter 450 from FIG. 4A, when partition A 502 is actively engaged in storage related activity, for example. Monitoring can further comprise adding the proportional fraction of overhead energy related to the partition, such as partition A 502, to the energy consumption of partition A 502 when partition A 502 is actively engaged in storage related activity for example. A means for providing an energy usage analysis of partition A 502 over a period of time can be done with stored power data accumulated by a storage component, such as a space on a disc drive 414 associated with the storage system 500 for example.

Figure 9:
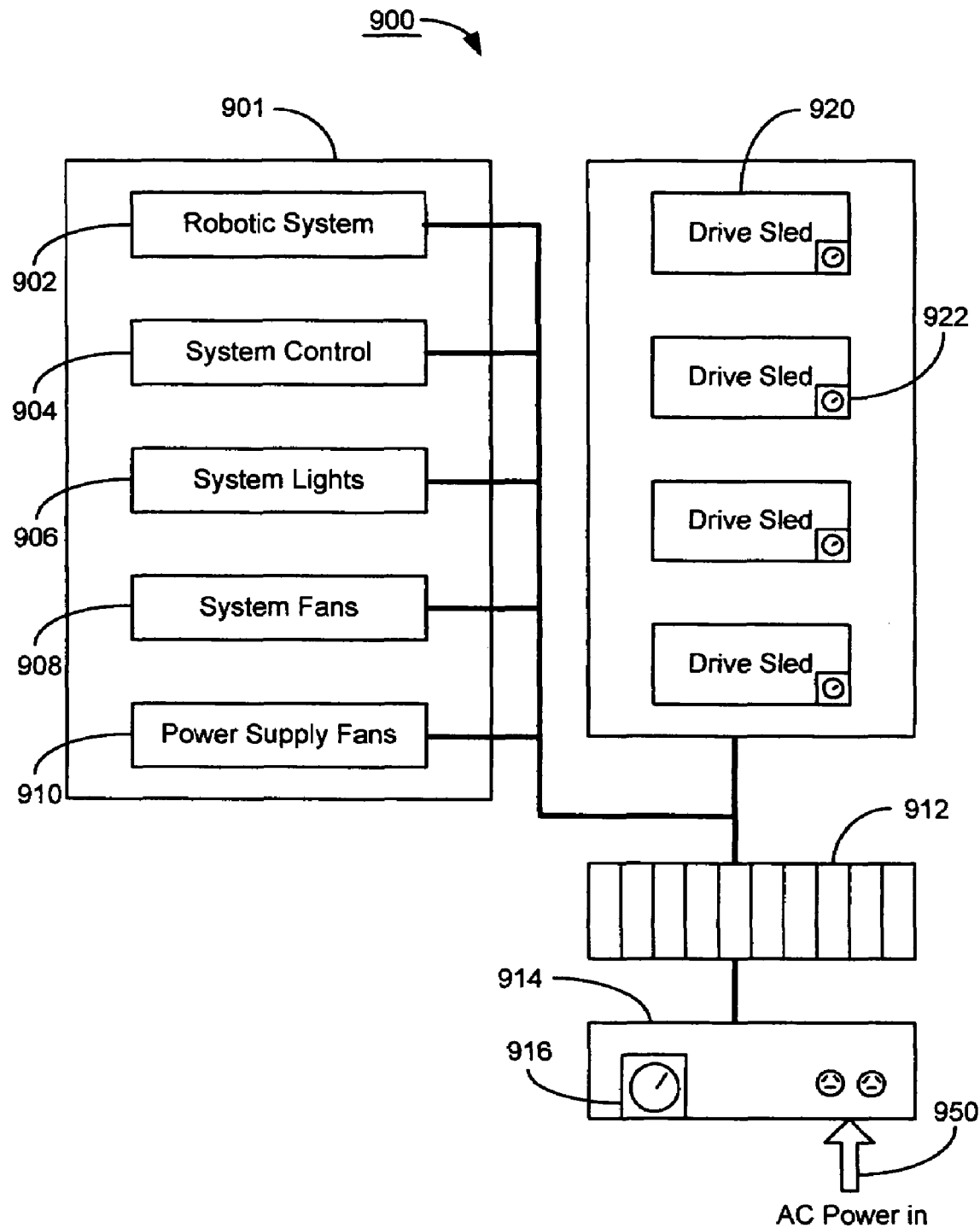
FIG. 9 is a T-950 storage system in which the present invention can be commercially practiced consistent with some embodiments of the present invention.

Embodiments of the present invention can be commercially practiced with a Spectra Logic T-950 storage system 900 of FIG. 9, performing as a storage system 106, for use with RXT disc drive magazines 401 of FIG. 4B and optionally tape drive systems, such as a tape drive 222 from FIG. 3 for use with tape cassettes 230. As previously described, an RXT disc drive magazine 401 encases a plurality of disc drives, such as 414, which can be provided by Seagate Corporation of Scotts Valley, Calif. The tape drives for use with a T-950 storage system 900 can be LTO-2 tape drives provided by IBM Corporation of Armonk, N.Y. which are capable of reading and writing data to and from LTO-2 tape cassettes also provided by IBM. A host computer, such as the host 102 from FIG. 1, is capable of communicating with the T-950 storage system 900 by means of a SCSI tape (streaming) protocol, such as that provided by Veritas Corporation of Mountain View, Calif., whereby the RXT T-950 storage system 900 can appear in a virtual sense as a traditional tape-based library to the host 102. Hence, data sent to and retrieved from the T-950 storage system 900 can be in the form of a sequential tape format.

As shown by the block diagram of FIG. 9, in the illustrative T-950 storage system 900, the overhead energy consumption is consumed by overhead components 901 which generally includes a robotic system 902 for transferring tape cassettes, a system control 904 (which is the global intelligence of the system 900 such as an internal CPU for example), system lights 906, system fans 908 (for general system 900 cooling), and power supply fans 910 (to cool the power supplies 912). 240 Volt (V) Alternating Current (AC) 950 is provided to the T-950 through a transfer switch box 914, wherein the system energy is monitored by an AC T-950 system energy meter 916 adapted to provide energy data to dedicated storage within the system control 904. The AC power is converted to Direct Current (DC) at the 5V/12V power supplies 912. Power is then provided to the overhead components 901 and the drive sleds 920 which are capable of supporting and providing power to RXT disc drive docking stations 402 or LTO-2 tape drives. The LTO-2 tape drives and the TXT disc drive docking stations 402 cooperate with storage media (LTO-2 tapes and disc drive magazines 401, respectively) comprising the total user storage capacity in the T-950. Each of the drive sleds 920 comprises a dedicated drive sled energy meter 922 that is adapted to provide energy data to the dedicated storage within the system control 904.

The T-950 storage system 900 is capable of having the total user storage capacity divided into two or more partitions which can be of equal or different sizes. Spectra Logic is capable of partitioning a physical library into multiple logical libraries with a partitioning engine which includes a Library Controller (LC) and associated software developed at Spectra Logic under the name Shared Library Services (SLS). The T-950 storage system 900 is also capable of monitoring the energy used by each of the partitions by monitoring the energy consumed by the drive sleds 920 associated with the specific partition when in use, or active. This is accomplished by an accounting program operating from the system control 904 that monitors the drive sled energy meter(s) 922 that is or are associated with a specific active partition. The overhead energy consumption used by the overhead components 901 is measured by the T-950 system energy meter 916 while the T-950 STORAGE SYSTEM 900 is in a non-active state wherein no user storage operations are occurring. The overhead energy consumption of the partitions are proportionally accounted for with each of the partitions relative each partition's percentage of the total user storage capacity of the T-950 STORAGE SYSTEM 900.

Figure 10:
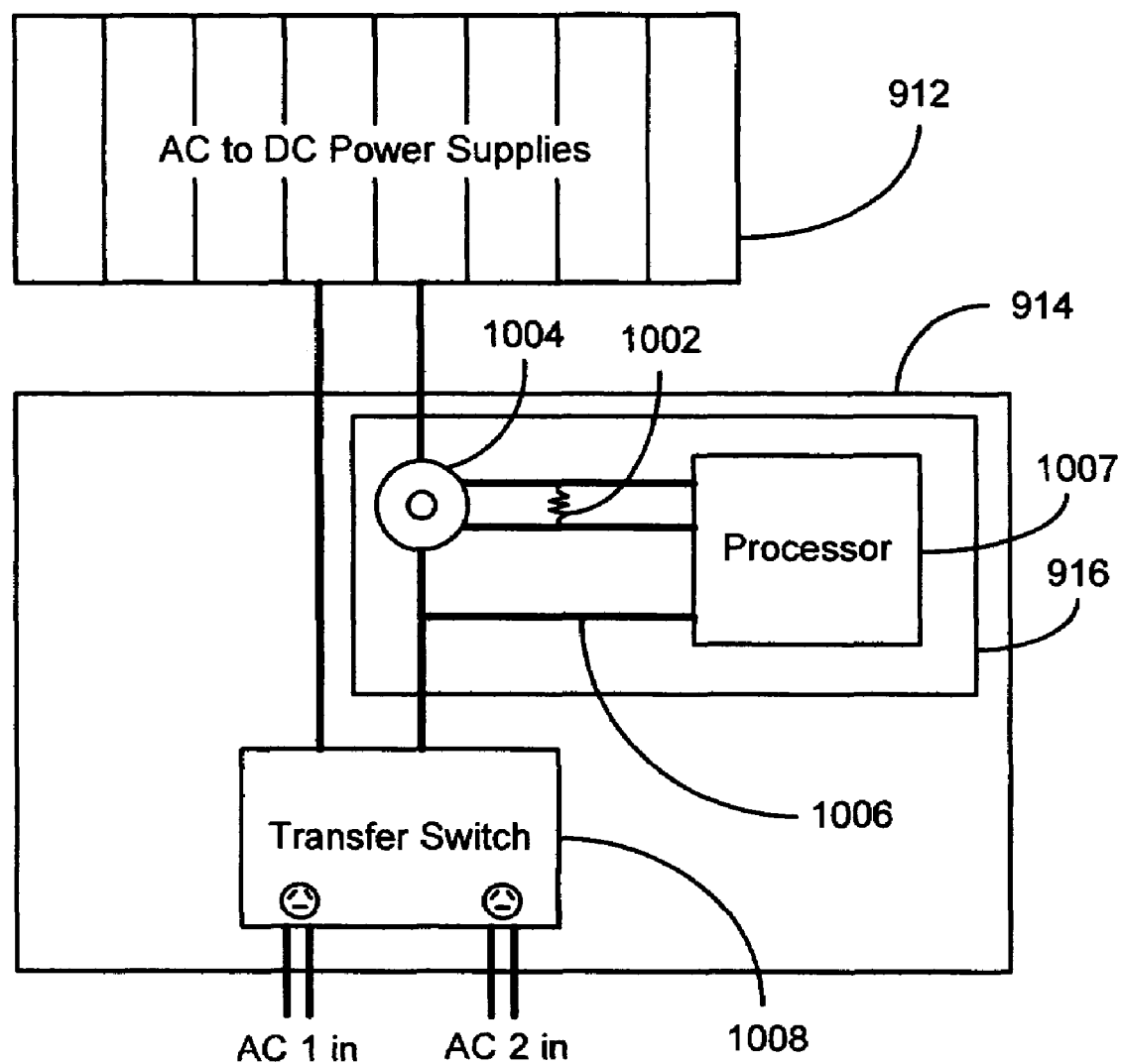
FIG. 10 is a block diagram of a T-950 storage system energy meter embodiment wherein the present invention can be commercially practiced.

FIG. 10 is a block diagram of a T-950 storage system energy meter 914 embodiment wherein the present invention can be commercially practiced. Herein, the transfer switch box comprises a transfer switch 1008 adapted to transfer power sources for redundant power supply to the T-950 STORAGE SYSTEM 900 in the event of a power disruption and a storage system energy meter 914. The storage system energy meter 916 comprises a Texas Instruments MSP 430F1331PM processor 1007 from Texas Instruments Corporation from Austin, Tex. with a voltage meter line 1006 and CR 8348-2000 current transformer 1004 from CR Magnetics Inc., from St. Louis, Mo. with a matched load resistor 1002. The 240 AC power is converted to 5V/12V and 24V DC power in the AC to DC power supplies 912. The processor 1007 is adapted to transmit the measured power to the system control 904 to store the data for energy usage over time.

Figure 11:
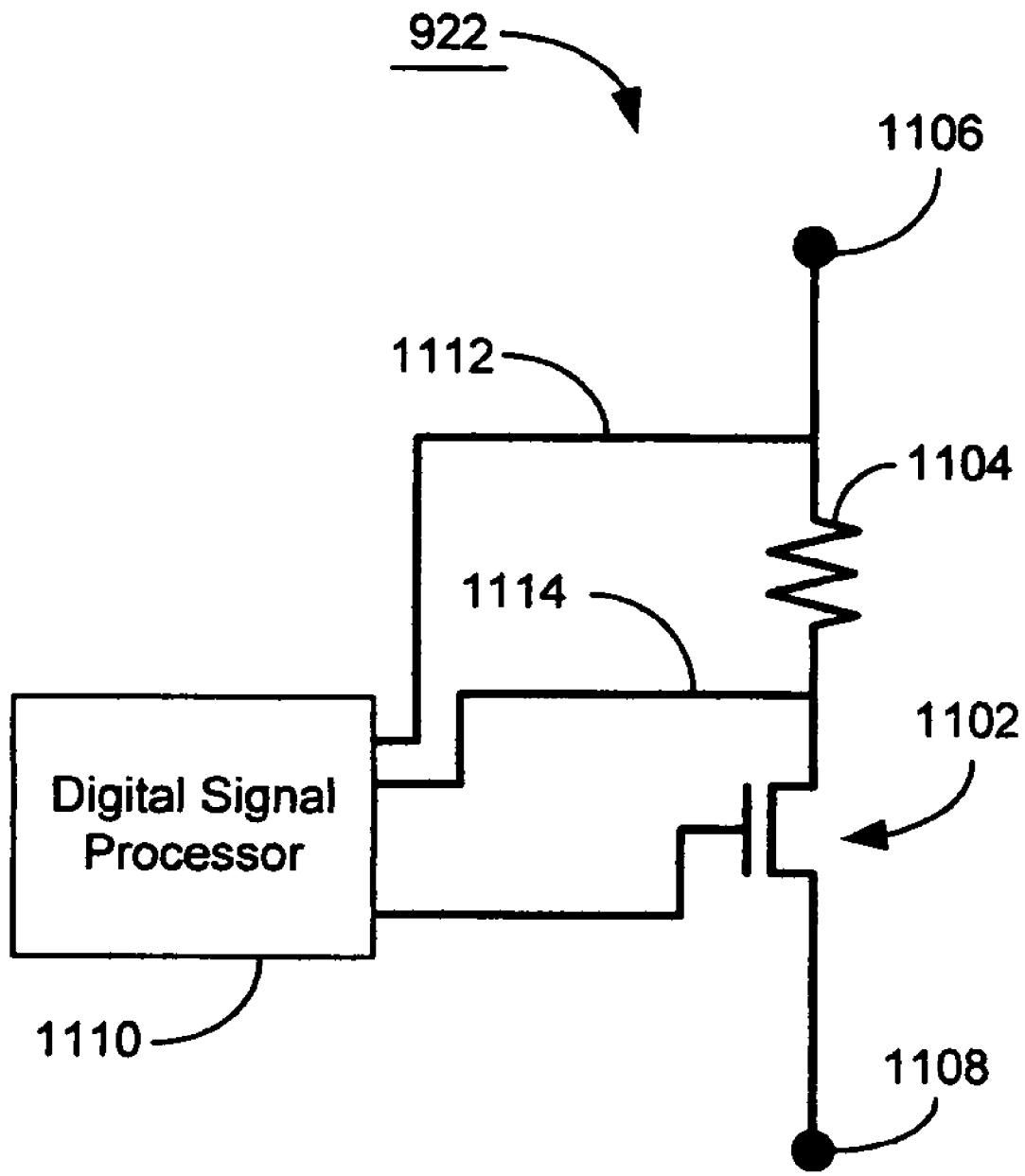
FIG. 11 is a block diagram of a drive sled energy meter embodiment wherein the present invention can be commercially practiced.

FIG. 11 is a block diagram of a drive sled energy meter 922 embodiment wherein the present invention can be commercially practiced. Herein, DC power is supplied to a node 1108 from the power supply 912 whereby it passes through an on/off control 1102 and to a second node 1106 and from there on to a drive sled 920. Analog to digital inputs 1112 and 1114 enable a Motorola DSP56F805 Digital to Signal Processor (DSP) to measure the voltage across a 0.01 Ohm 5 Watt resistor. The DSP is capable of calculating the current and Watt hours. The power information collected by the DSP is transmitted to the system control 904 for storage and manipulation.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the energy of each partition, such as partition A 502 from FIG. 5, can be calculated a number of ways which may not account for the exact usage of energy by a specific partition while still maintaining substantially the same functionality without departing from the scope and spirit of the present invention. Further, the energy can be calculated and manipulated to substantially determine the amount of energy used by a specific partition by a number of combinations of system energy monitoring and/or component energy monitoring not necessarily described in any particular example described herein without departing from the scope and spirit of the present invention. Finally, although the preferred embodiments described herein are directed to storage systems, such as storage system 106, and related technology, it will be appreciated by those skilled in the art that the teachings of the present invention can be applied to other systems, without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A storage system comprising: a plurality of electric energy consuming components; the electric energy consuming components comprising at least a plurality of storage devices adapted to cooperate with storage media for storing data; the storage system comprising a total user storage capacity for the storage system; at least one component energy meter capable of measuring component energy consumption of at least one of the electric energy consuming components while the storage system is in operational use; at least one storage system energy meter adapted to cooperate with the storage system to measure total energy consumption of the storage system while the storage system is in operational use.

2. The storage system of claim 1 wherein each of the electric energy consuming components cooperates with a dedicated component energy meter.

3. The storage system of claim 1 further comprising at least one robotic system adapted to move the storage media within the storage system wherein the robotic system is capable of cooperating with one of the component energy meters for measuring energy consumption of the robotic system.

4. The storage system of claim 1 wherein the total user storage capacity is divided into at least two partitions wherein each of the partitions is capable of being monitored for partition energy consumption.

5. The storage system of claim 4 further comprising an algorithm for accounting energy usage for each partition.

6. The storage system of claim 4 wherein the partition energy consumption is monitored from the at least one component energy meter cooperating with the at least one energy consuming component associated with the partition.

7. The storage system of claim 6 wherein the energy consuming component is temporarily associated with the partition.

8. The storage system of claim 7 wherein the partition energy consumption is further monitored from overhead energy consumed proportional to the divided total capacity of the partition as measured by the storage system energy meter.

9. The storage system of claim 1 wherein the energy consuming component comprises the component energy meter.

10. The storage system of claim 1 wherein the storage device is from the group comprising: flash memory system, magnetic disc drive, disc drive magazine, magneto-optical drive, tape drive, and floppy disc drive.

11. The storage system of claim 1 wherein the storage media is media from the group comprising: digital magnetic floppy disc, digital compact disc, digital flash memory device, digital tape cassette, digital optical disc, and digital tape magazine element.

12. A method for monitoring energy consumption of a storage system comprising:
  measuring at least total storage system energy consumption of the storage system while the storage system is in operational use wherein the storage system comprises a plurality of energy consuming components;
  performing an energy usage analysis of the total energy consumption over a period of time; and
  compiling a viewable report of said energy usage analysis.

13. The method of claim 12 further comprising monitoring component energy consumption of at least one electric energy consuming component comprised by the storage system while the storage system is in operational use and providing the energy usage analysis for the component energy consumption over a period of time.

14. The method of claim 12 further comprising partitioning the storage system into at least two fractions comprising a total user storage capacity of the storage system and monitoring partition energy consumption by the partition.

15. The method of claim 14 wherein the monitoring is accomplished with at least one component energy meter cooperating with the at least one electrical energy consuming component.

16. The method of claim 15 wherein the monitoring is further comprises overhead energy consumed proportionally by the partition.

17. An energy monitoring storage system comprising: a plurality of electric energy consuming components; the electric energy consuming components comprising at least a plurality of storage devices adapted to cooperate with storage media for storing data; the storage media comprising a total user storage capacity for the storage system; at least one storage system energy meter adapted to cooperate with the storage system to measure total energy consumption of the storage system while the storage system is in operational use; the total user storage capacity capable of being divided into at least two partitions wherein each of the partitions is capable of being monitored for partition energy consumption.

18. The storage system of claim 17 wherein the partition energy consumption is monitored from overhead energy consumed proportionally by the partition plus an increase in the total energy use over a period of time in which the partition is active as measured by the storage system energy meter.

19. The storage system of claim 18 further comprising an accounting algorithm capable of accounting the partition energy consumption by monitoring an increase in the total storage system energy consumption in addition to adding a proportion of a total overhead energy consumed by the partition.

20. A means for monitoring energy consumption of a storage system comprising: a means for measuring component energy consumption of at least one electric energy consuming component comprised by the storage system while the storage system is in operational use; a means for measuring total storage system energy consumption of the storage system while the storage system is in operational use; a means for partitioning the storage system into at least two fractions comprising a total user storage capacity of the storage system; a means for monitoring partition energy consumption by the partition; a means for providing an energy usage analysis of the at least one of the partition over a period of time.

21. The means of claim 20 wherein the energy usage analysis providing means can done with multiple partitions coincidentally.

22. A method for allocating energy consumption costs to each respective user of a partitioned data storage system comprising the steps of:
  calculating an overhead energy cost associated with each respective user's data partition;
  monitoring the actual energy consumption associated with each respective user's data partition, and calculating an actual energy consumption cost based thereon;
  summing the overhead energy cost with the actual energy consumption cost to calculate an allocated energy cost for the each respective user; and
  presenting the allocated energy coast in a viewable format to each of the respective users.

* * * * *